United States Patent [19]

Jeppson

[11] 4,052,858
[45] Oct. 11, 1977

[54] METHOD AND APPARATUS INTEGRATING WATER TREATMENT AND ELECTRICAL POWER PRODUCTION

[76] Inventor: Morris R. Jeppson, Box 4943, Carmel, Calif. 93921

[21] Appl. No.: 539,338

[22] Filed: Jan. 8, 1975

[51] Int. Cl.$^2$ .................................... F01K 17/02
[52] U.S. Cl. ............................ 60/648; 60/688; 60/689; 203/DIG. 20; 203/95; 210/64; 210/71; 21/56; 60/325
[58] Field of Search .......... 60/648, 688, 689, 325; 203/DIG. 20, 95–97; 202/136; 210/12, 64, 71; 261/87; 21/56

[56] References Cited
U.S. PATENT DOCUMENTS

| 1,797,769 | 3/1931 | Grindrod | 261/87 |
| 2,893,926 | 7/1959 | Worthen et al. | 60/648 |
| 3,470,943 | 10/1969 | Van Huisen | 60/641 |
| 3,481,692 | 12/1969 | Linder | 21/56 X |
| 3,776,531 | 12/1973 | Ebner et al. | 261/87 |
| 3,926,743 | 12/1975 | Cywin | 60/648 |

Primary Examiner—Allen M. Ostrager
Attorney, Agent, or Firm—Phillips, Moore, Weissenberger, Lempio & Majestic

[57] ABSTRACT

Steam resources, which may in some cases be of forms heretofore considered unusable because of low energy content or corrosive contamination, are used for electrical power and water treatment operations in installations where these formerly separate activities may be combined, with the waste products of one being a valuable input to the other. In one embodiment, discharge heat from a steam driven generating station and contaminated sewage water, each of which formerly presented costly or environmentally hazardous disposal problems, are combined to produce sterilized water reusable for crop irrigation. In another embodiment, fresh water enroute to a municipal utility system is used to condense discharge steam from generating station turbines for return to the boilers while sterilizing the water to reduce or eliminate cholorination requirements. Still another embodiment enables use of turbine driven generators to produce electrical power from corrosive geothermal steam sources without exposure of the turbines to such steam and sewage water may be sterilized as a by-product of the system. Means are also disclosed for the large scale pumping of water utilizing such steam energy.

44 Claims, 13 Drawing Figures

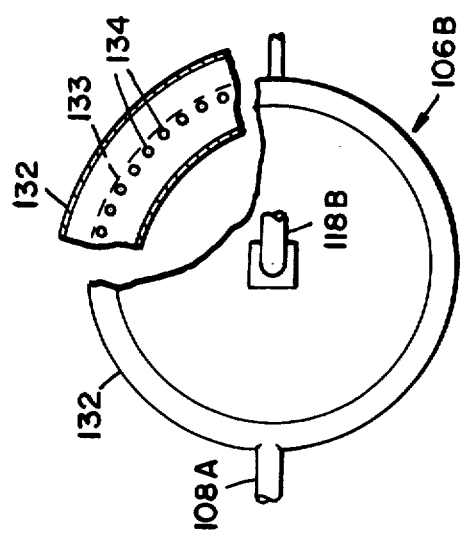
FIG_6
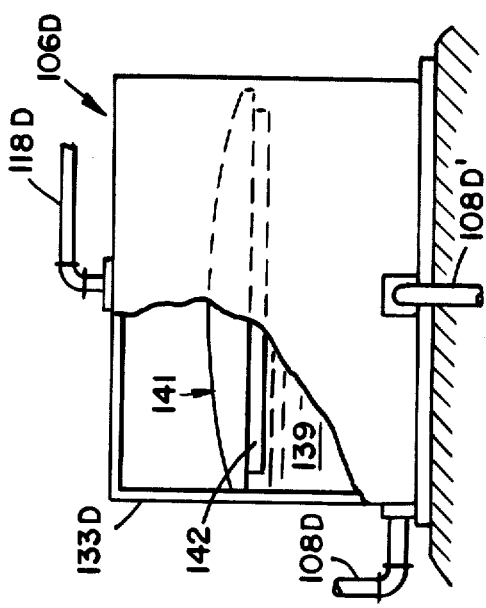
FIG_7
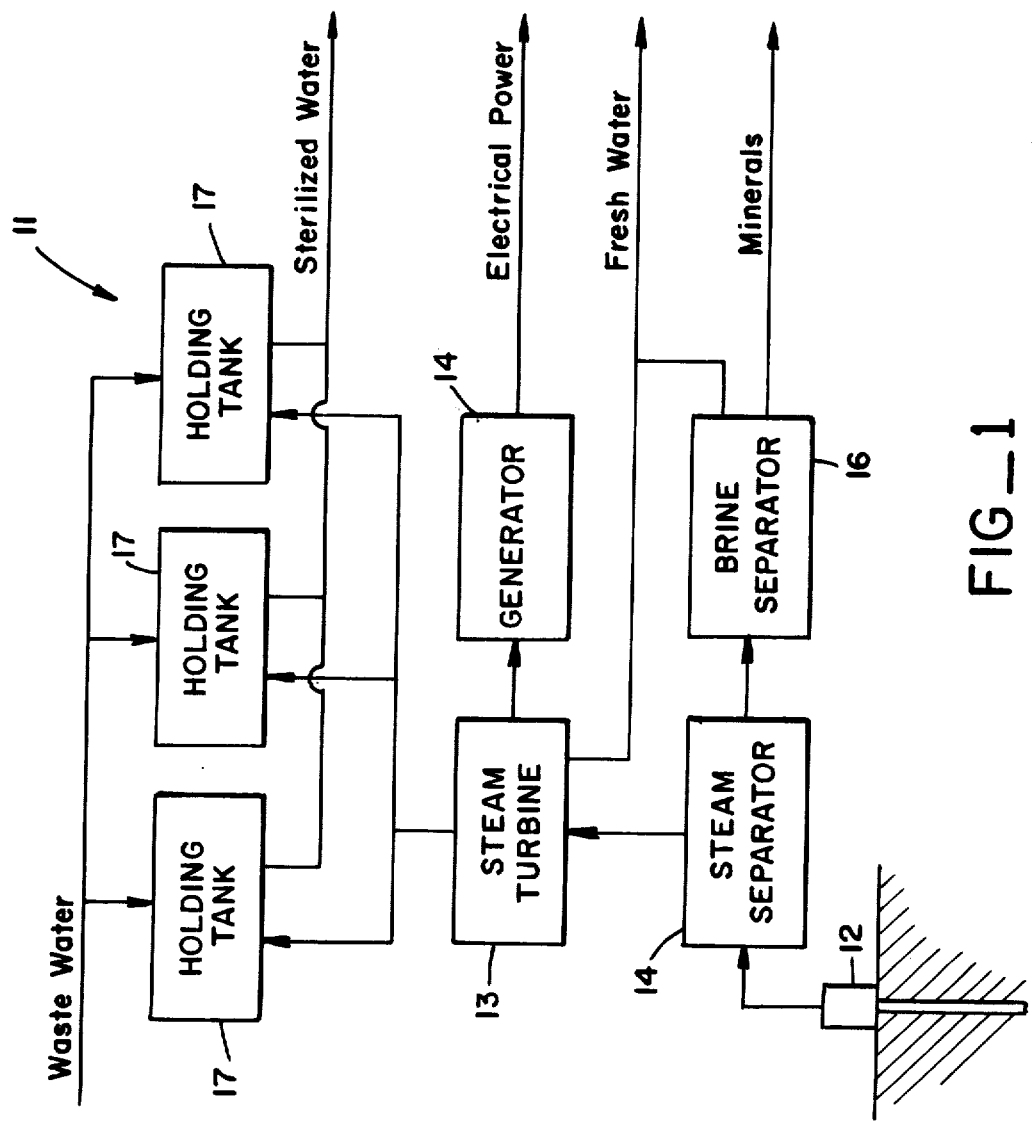
FIG_1

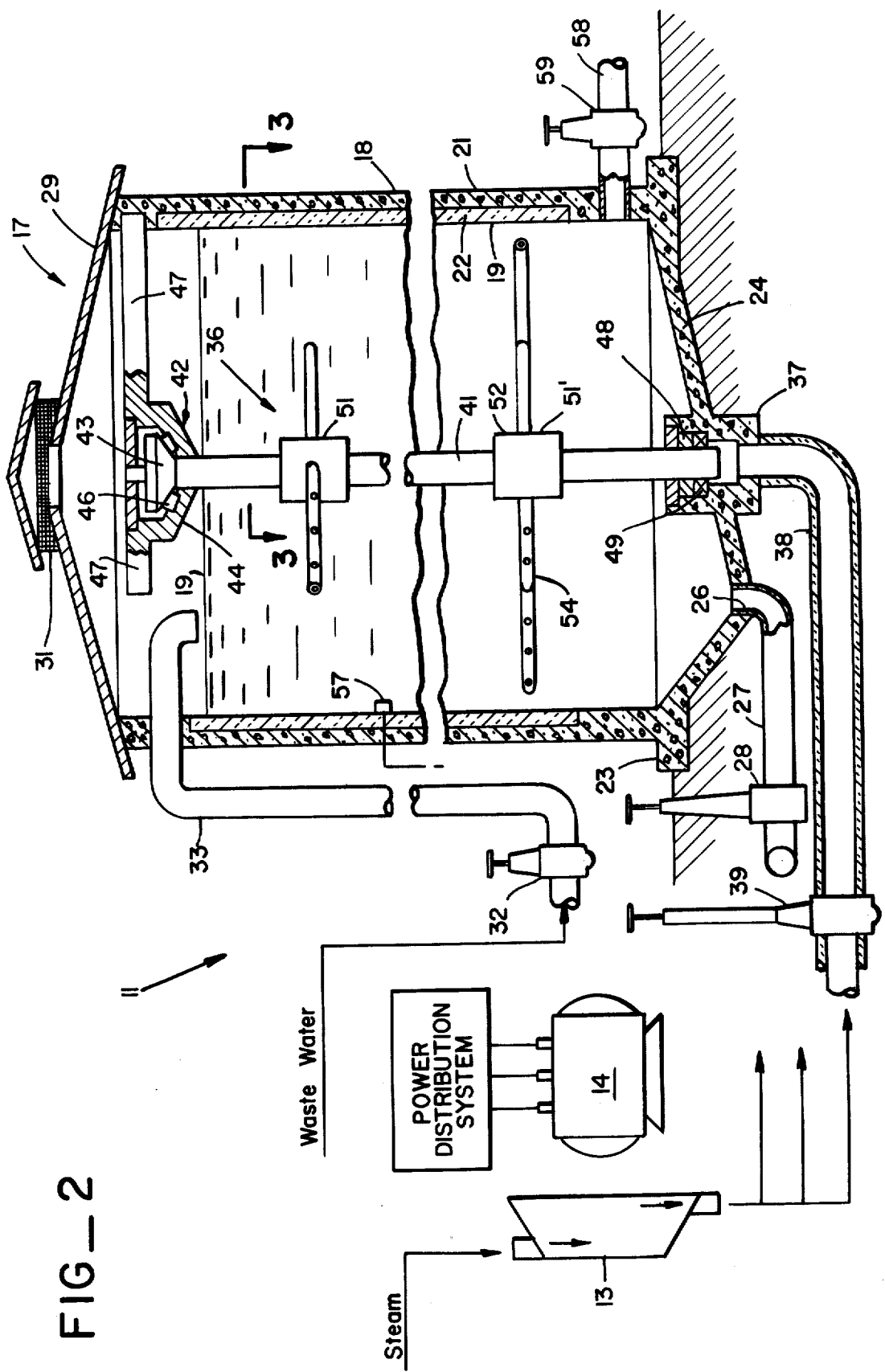
FIG_2

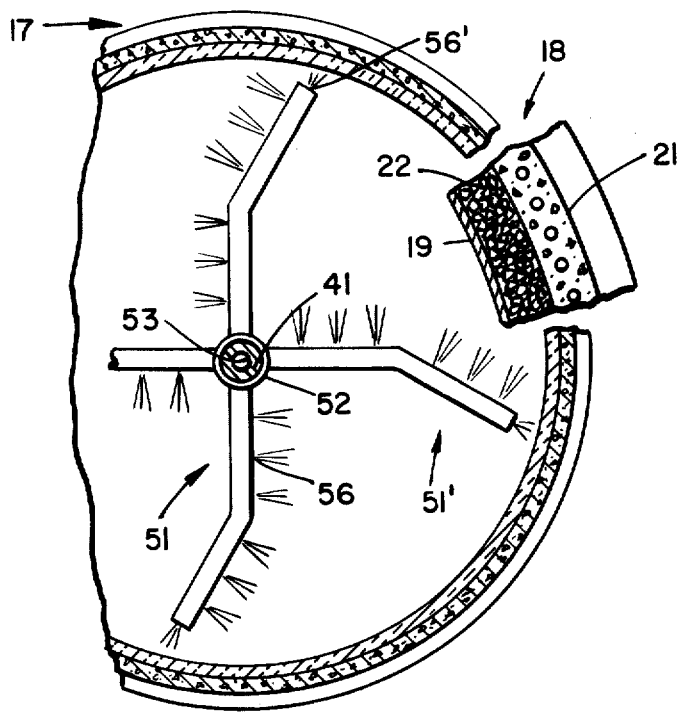
FIG_3
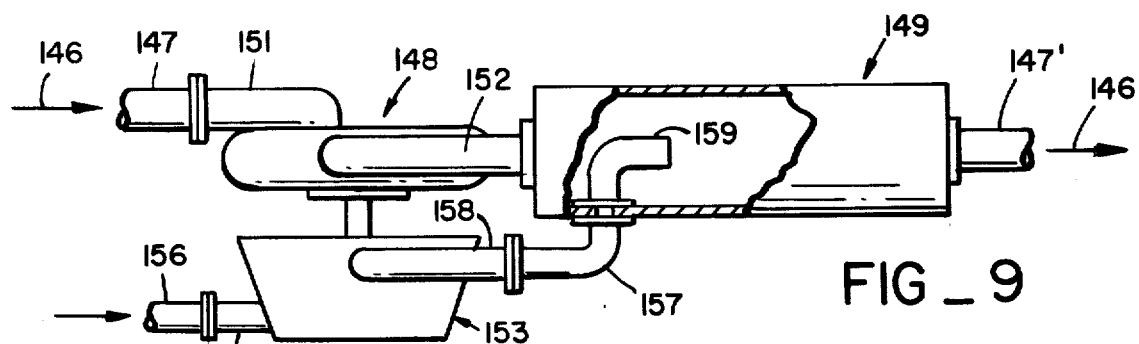
FIG_9
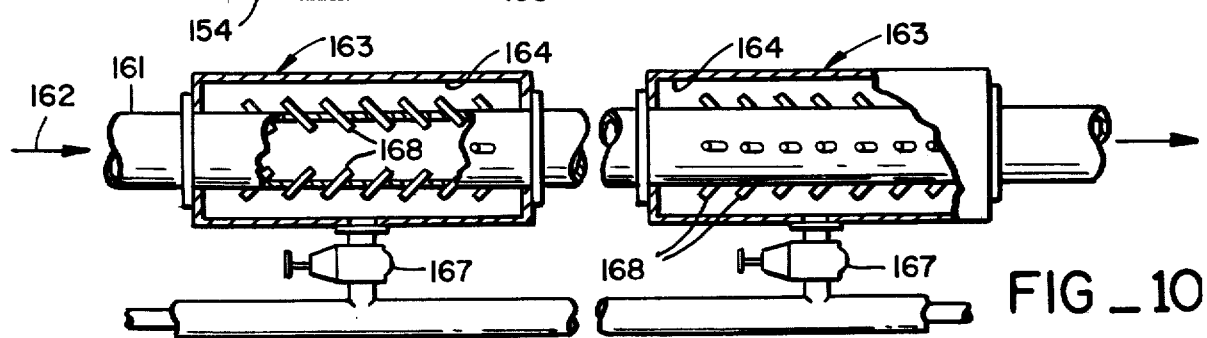
FIG_10
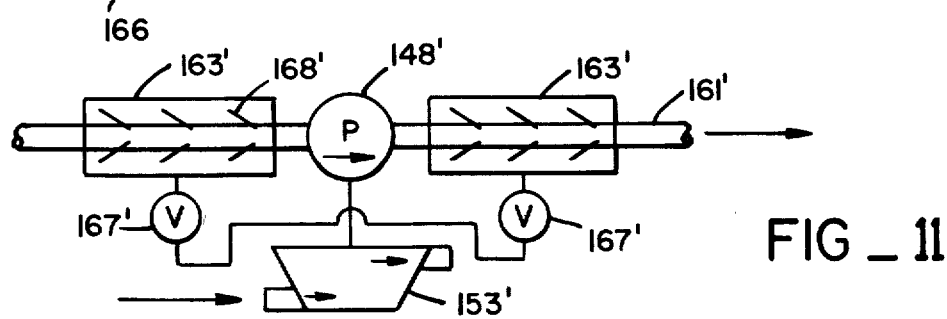
FIG_11

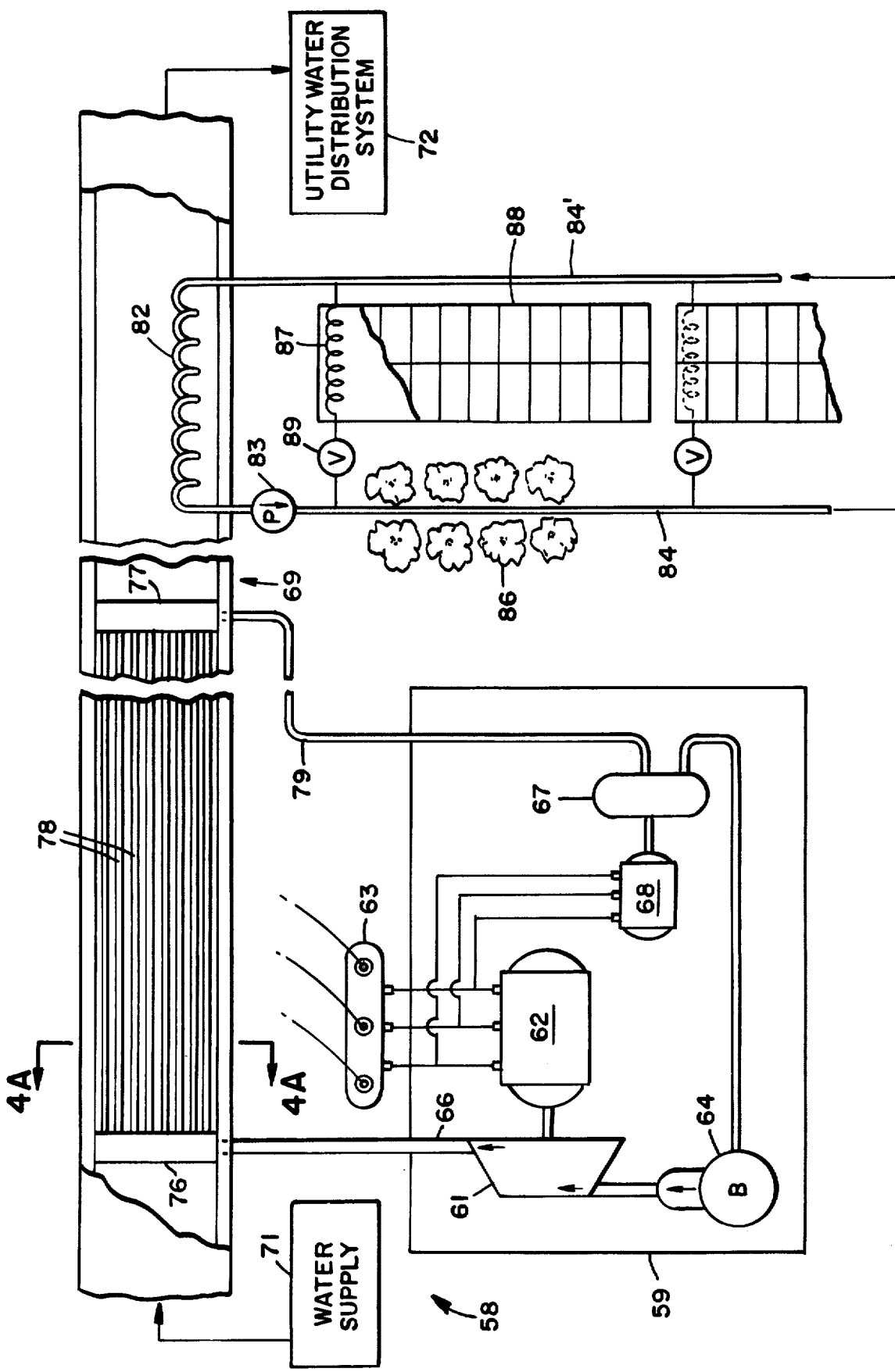
FIG_4

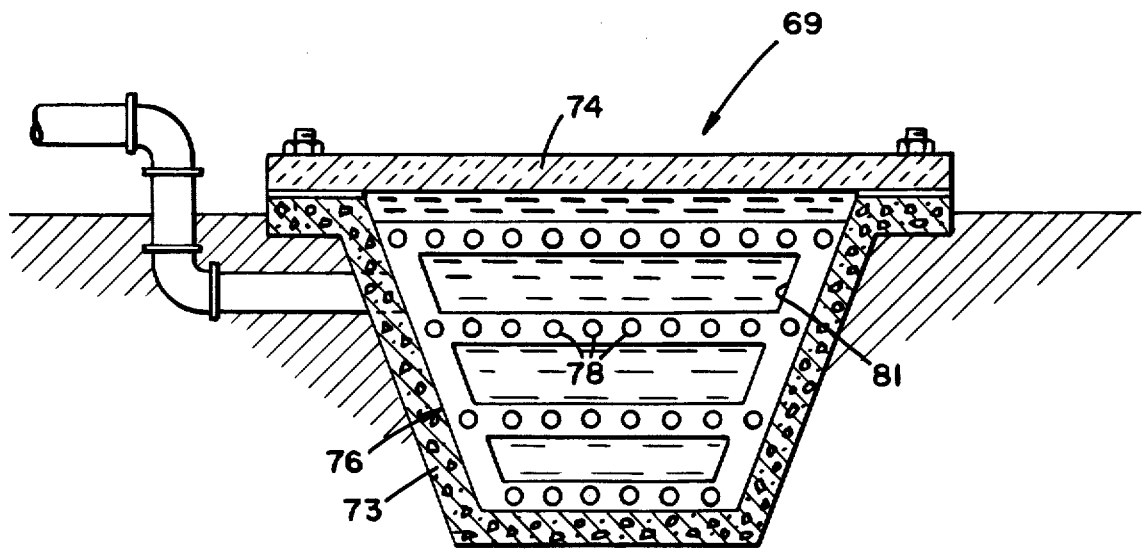
FIG_4A
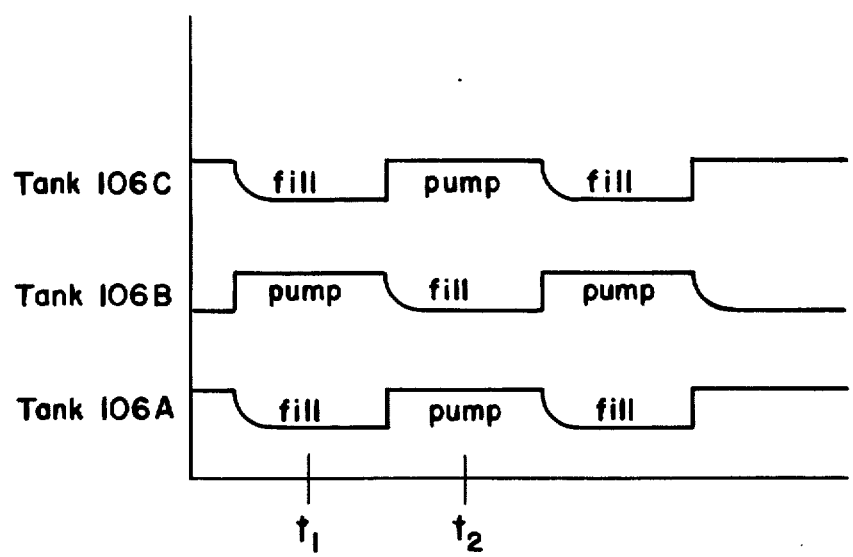
FIG_5A

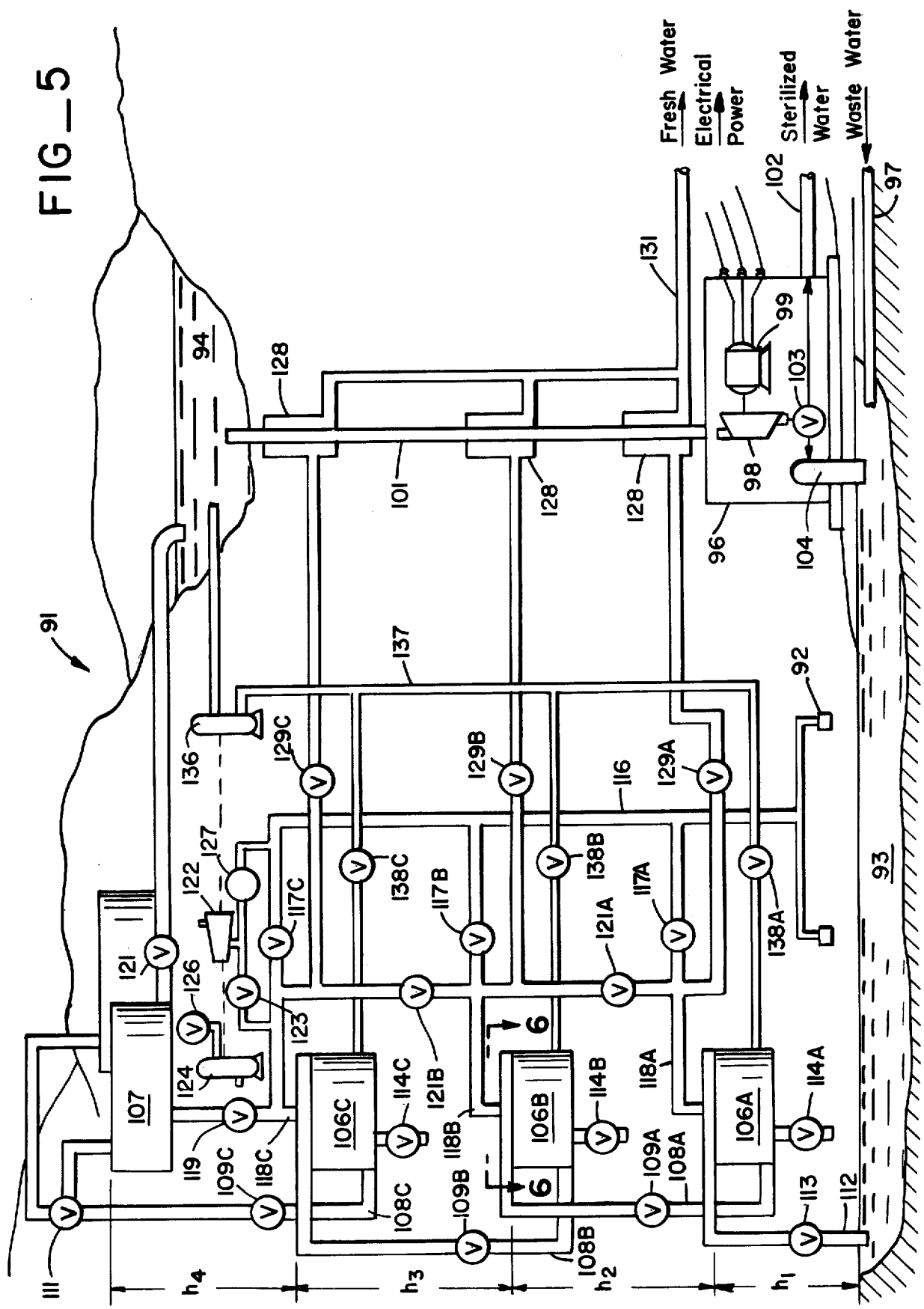

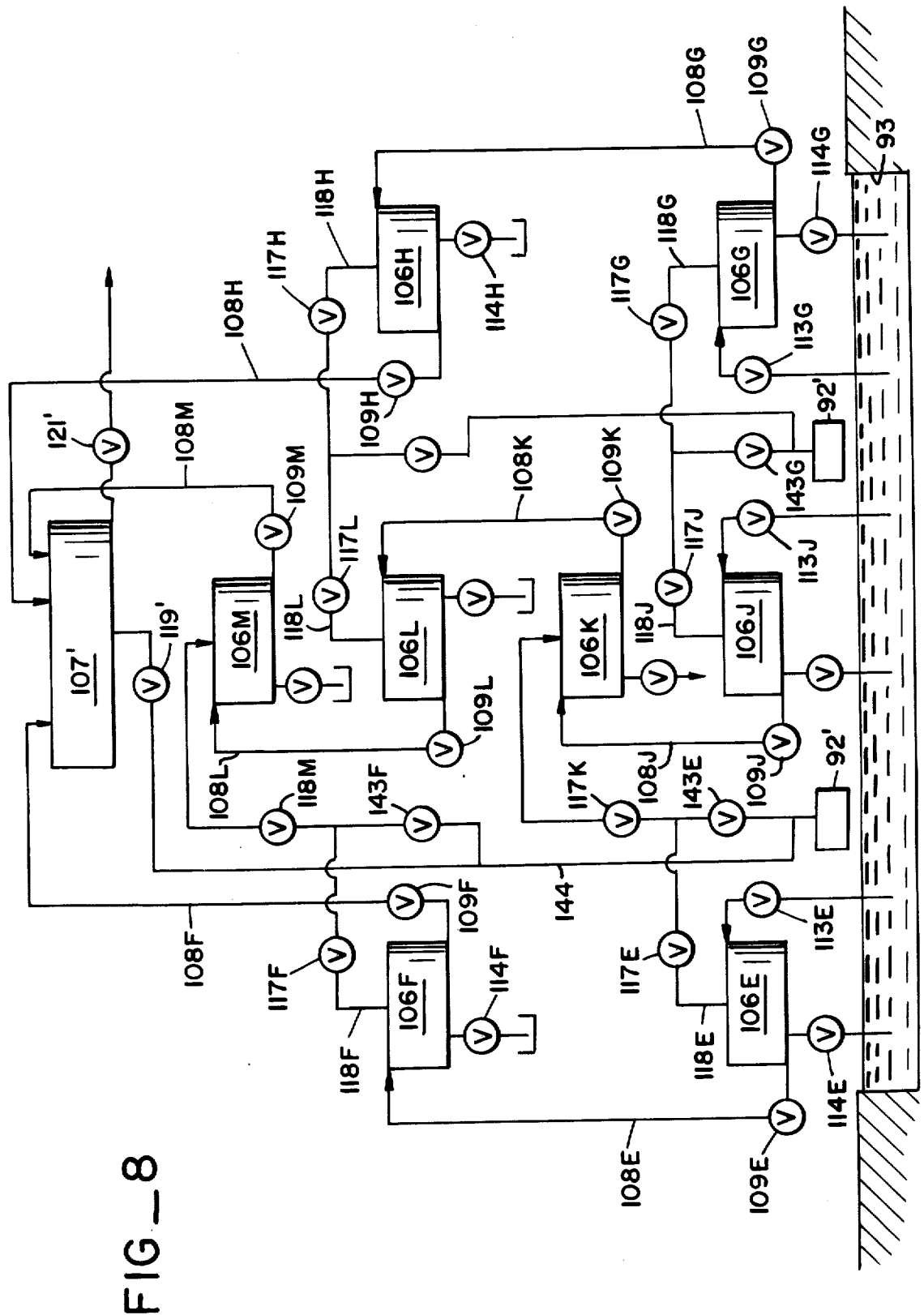
FIG_8

METHOD AND APPARATUS INTEGRATING WATER TREATMENT AND ELECTRICAL POWER PRODUCTION

BACKGROUND OF THE INVENTION

This invention relates to the large scale processing of water for urban, industrial or agricultural use and also to the production of electrical power. More particularly the invention relates to methods and apparatus enabling an advantageous combining of these formerly separate operations in installations where former waste products of one operation may be utilized in the other.

As a serious shortage of usable water exists in many regions, increased efforts are being made to expand and improve water supply operations and to reclaim and reuse waste water. In most urban and industrial areas water from natural sources must be imported and must be treated to assure that it is suitable for human consumption although much of the water is not ultimately used for that purpose. Following usage, the water enters a sewage system and immediately becomes a serious disposal problem as it is contaminated with particulate matter, bacteria and viruses and the like. Concern over environmental pollution has made it necessary to perform costly further operations simply to convert the sewage water into a form suitable for discharge into rivers and oceans. Recovery of such waste water for reuse, using known technology, is an extremely costly process. The problems of water management have been still further complicated with the recent realization that chlorination of water may itself contribute to the formation and accumulation of toxic chemicals in water supplies.

Thus very costly installations and operations are needed to transport and treat water which for the most part is used only once after which the end product is waste water which is itself costly to dispose of.

Water management must take agricultural needs into account to a greater extent than has heretofore been the case. Population growth has outstripped the food production capabilities of existing agricultural lands. It is well recognized that the productivity of farm lands must be increased and that it would be highly desirable to enable the growing of crops on lands which are not presently considered suitable for this purpose. Primarily, this is a matter of providing irrgation water and plant nutrients for regions where these are not presently available in sufficient quantities. There is much unused land, notably in arid regions, which could potentially produce food. Large scale conversion of such land to productive agricultural use, using known techniques, is often not economically feasible at this time.

Considering now another and seemingly unrelated resource problem, there have recently been shortages of electrical energy for utility purposes. Much electrical power production is realized with generators driven by steam powered turbines. The steam is usually produced by burning fossil fuels although lately there has been considerable interest in expanding usage of geothermal steam sources.

In steam driven power systems, it is not possible to convert the total energy content of the steam to electrical power, typical conversion efficiencies being well under 50%. A very substantial portion of the steam energy content cannot be recovered as electric power in conventional systems. The expanding steam drives the turbine. When the steam has too little remaining energy to exert the necessary force on the turbine blades, it must be vented or condensed and the heat of vaporization, which may be more than half of the original content of the steam is thereby wasted. It is not only wasted, but in fact presents a very serious disposal problem. In most cases such steam cannot be simply discharged, but must be condensed. This requires large amounts of cooling water or very costly equipment to disperse the heat which has been extracted from the steam in the condensation process. Discharged hot cooling water may in turn cause environmental problems. Thus a parallel with the water management problem may be seen. Much of a potentially useful product, heat energy in this case, is unutilized and in fact presents a disposal problem.

Under-utilization of steam resources is not limited to the loss of thermal energy from turbine discharge steam as discussed above. There are potential steam sources for power generation plants which cannot readily be used with existing technology. Many geothermal steam sources, for example, are not readily usable because of a relatively low energy content in comparison with steam produced in a boiler by burning fossil fuels or because of the presence of highly corrosive contaminants such as brine that cause rapid deterioration of turbines and other power station components.

Thus, there are scarcities of many resources including usable water, productive farm land and electrical power. The existing technologies for resolving these problems require extremely costly equipment and operations while being inefficient in the sense that much of the desired end product is not only wasted but also creates a costly disposal problem.

In some regions, each of the problems discussed above not only exist side by side but have become extremely critical. In southern California, for example, there is a very large and growing urban area with increasing demands for electrical power, usable water and food that cannot be satisfied from local resources using known technology. Concurrently, the problem of disposing of sewage water and discharged thermal energy from power generation facilities in this region have become severe. Adjacent this metropolis is a sparsely populated desert with undeveloped geothermal energy reserves and having soils and climatic conditions suitable for highly productive agricultural operations if water and plant nutrients are made available.

Much effort is being devoted to resolution of each of the problems discussed above, but each has been treated as a separate activity having little relation to the other. It has not been recognized to any great extent that combined solutions are possible in which the waste products or rejected resources of one such operation may be converted into valuable raw material for another. This is due, at least in part, to a lack of practical processes and apparatus for effecting such integrations.

SUMMARY OF THE INVENTION

This invention provides practical and economically feasible methods and apparatus, which utilize steam energy for such operations as sterilization of fresh or sewage water, electrical power generation and the large scale pumping of water and includes systems which may combine two or more of these operations to transform former waste products into valuable commodities. The energy requirements for such systems, in some embodiments, may be derived from steam sources which have heretofore presented heat disposal problems, such as the discharge from generating station turbines, or from sources formerly considered unusable such as low energy or corrosive steam wells.

In one embodiment of the invention, discharge steam from a power generating station is used to heat and sterilize contaminated sewage water which may then be used for agricultural irrigation or other purposes. In another embodiment of the invention, fresh city utility water is sterilized by a heat exchange with the discharge steam of electrical generation facilities thereby reducing or eliminating chlorination requirements while also eliminating the need for conventional condensation structures and cooling water at the power station. In still another embodiment, geothermal steam is utilized to lift water, which may be waste water that is sterilized in the process, to an elevated reservoir from which it may be caused to operate hydroelectric generators before being utilized for crop irrigation or the like. The invention also provides simplified and economical means for the large scale pumping or moving of water utilizing energy from steam resources of the kind discused above.

Accordingly, it is an object of this invention to enable more productive usage of water and energy resources.

It is an object of the invention to resolve waste product disposal problems associated with water systems and with power generation stations by enabling use of such products for productive purposes.

It is another object of the invention to provide for more complete usage of the energy content of steam from steam sources.

It is still another object of the invention to provide simplified and economical methods and apparatus for sterilizing water, for producing electrical power, and for pumping and transporting water, utilizing steam energy.

The invention, together with further objects and advantages thereof, will best be understood by reference to the following description of preferred embodiments taken in conjunction with the accompanying drawings.

BRIEF DESCRIPTION OF THE DRAWINGS

In the accompanying drawings:

FIG. 1 is a schematic illustration of a combined electrical power generation and waste water sterilization system;

FIG. 2 is a more detailed view of portions of the system of FIG. 1 including an elevation section view of a water sterilization tank suitable for use therein;

FIG 3 is a plan section view taken along line 3—3 of FIG. 2 further illustrating the structure of the water sterilization tank and wherein a portion of the wall thereof is shown enlarged relative to the remainder thereof;

FIG. 4 is a plan view of an integrated power generation station and municipal water supply sterilization facility;

FIG. 4A is a cross section view taken along the 4A—4A of FIG. 4;

FIG. 5 is an elevation view of another form of integrated waste water recovery and power generation facility utilizing steam energy to elevate and sterilize waste water which then operates hydroelectric power generation means and which may subsequently be used for crop irrigation;

FIG. 5A is a diagram of pumping cycles in the system of FIG 5;

FIG. 6 is a partially broken out plan view of one form of water pumping tank which may be used in the system of FIG. 5, with a portion of the structure being shown in enlarged form relative to the remainder thereof;

FIG. 7 is a broken out elevation view of another form of pumping tank which may be used in the system of FIG. 5;

FIG. 8 is a diagramatic elevation view of a modification of the water elevating system of FIG. 5 wherein a greater portion of the available steam energy may be utilized;

FIG. 9 is a broken out view of an alternate means utilizing steam energy for pumping and heating water;

FIG. 10 is a broken out view of another alternate means for pumping and heating water; and FIG. 11 is a diagramatic view of still another alternate means for pumping and heating water which combines aspects of the apparatus of FIGS. 9 and 10.

DESCRIPTION OF PREFERRED EMBODIMENTS

The invention may take a variety of forms which all have in common the utilization of steam energy for such purposes as water heating or sterilization, water pumping and electrical power production and specific examples may combine some or all of these operations in one facility. By combining two or more of these operations using the novel techniques and apparatus of the invention, former waste products of one are converted into a valuable resource in another.

Prior facilities which make use of steam energy generally use the steam for a single purpose and, as a result, much potentially useful energy is wasted. Broadly, the present invention provides for using one portion of the energy content of steam for one purpose such as electrical power generating or water pumping while using another portion of the energy content for another purpose such as heating or sterilizing water supplies. This may best be understood by considering specific examples.

Referring now to FIG. 1, an example of the invention is shown in schematic form in which discharge steam from a power generation station is used for the purpose of sterilizing and recovering waste water and a further result is that the need for conventional steam condensors, cooling towers, cooling water or the like is reduced or eliminated.

The system 11 of FIG. 1 utilizes steam which may be derived from one or more geothermal wells 12 to operate a turbine 13 which in turn drives an electrical generator 14. If the geothermal steam source should be of the type producing steam contaminated by brine or other minerals, the steam may be passed through a separator 14 which transmits purified steam to the turbine while diverting the brine to another separator 16 which may then produce fresh water and valuable salts or other minerals as by-products of the operation. The fresh water may be combined with condensate from the turbine and associated flow conduits, if desired, for delivery to a utility water system.

Geothermal steam power generating stations, utilizing turbines and generators and including steam separators in some instances are known to the art, although such resources have not been fully exploited in the past. Heretofore it has been the practice to simply discharge the steam from the turbines into the atmosphere, or else to condense such steam in costly cooling towers or the like in which case the heat energy of the discharged steam is itself released into the atmosphere or into natural bodies of water such as rivers or lakes. In eiter case, a substantial amount of potentially useful energy is wasted. The thermal energy which is released in the process of discharging or condensing geothermal steam is typically about 500 calories per gram of water. Further, the release of large amounts of heat into the environment of power stations may cause undesirable ecological disturbances.

This problem is resolved in the system depicted in FIG. 1 by bringing waste water to a series of thermally insulated holding tanks 17 situated in proximity to the turbines 13. The waste water may typically be sewage water which is contaminated with bacteria, viruses, toxins, spores and undesirable particulate matter and the like, and which has heretofore presented another costly and difficult disposal problem. The discharge steam from turbine 13 is injected directly into a holding tank 17 to accomplish the dual purpose of condensing the steam while sterilizing the waste water. The thermal energy of the steam is used to heat the waste water to a temperature in the range from about 160° F (71° C) to about 212° F (100° C) and the water is held at this temperature in a holding tank for a period sufficient to destroy living organisms such as bacteria, viruses, spores and the like. Holding times for this purpose are somewhat dependent on the degree of assurance of complete sterilization that is required, taking into account the use which will be made of the water, but will typically range from a minimum of about 30 minutes at the upper end of the above indicated temperature range to at least about six hours at the lower limit thereof. Holding periods of one to six hours at sterilizing temperatures in the range from about 175° F (79° C) to about 205° F (95° C) are most suitable under usual conditions of initial water contamination and desired safety factor.

After the water in one tank 17 has been heated to the desired temperature and the holding period at that tank is to begin, the discharge steam from turbine 13 is switched to another of the holding tanks. A sufficient number of such tanks may be provided so that the initially filled tank may be drained and readied to receive a new charge of waste water by the time that discharge of steam into the final one of the tanks is complete. In this manner, the discharge of steam from the turbine or turbines may be continuously disposed of and utilized.

The sterilized sewage water has now become a highly valuable asset, particularly in regions where there is a water scarcity. While the sterilized water can be further purified by known techniques for recycling to a city water system, it is particularly suited for agricultural crop irrigation. The sterilized sewage water as drained from the holding tanks 17 may contain a substantial amount of plant nutrients, including phosphates and nitrates in suspension and solution. The residual heat in the water may also serve to promote plant growth or to prevent freezing of cold sensitive crops as will hereinafter be discussed in more detail.

As pointed out above, the power generating components of the system depicted in FIG. 1, such as the turbine 13 generator 14, and any steam or brine separators which may be employed may be of conventional construction and accordingly will not be further described. Considering now an example of an advantageous detailed construction for the holding tanks 17 and associated means for combining discharge steam and waste water, reference should be made to FIGS. 2 and 3 in conjunction. The holding tanks 17 are of upright cylindrical configuration in this example and each has a wall 18 formed of materials which provide adequate strength for supporting the volume of water 19 while also providing thermal insulation to inhibit heat loss during the holding period. As best seen in FIG. 3 in particular, the wall 18 may have an inner liner 19 formed of high strength, corrosion resistant steel such as stainless steel and an outer portion 21 formed of reinforced concrete. A thick layer of thermal insulation 22 is disposed between the liner 19 and outer portion 21. While any of various thermal insulating materials may be employed, insulation 22 in this example is pumice gravel which is an excellent insulator for this purpose and which is also often found in the vicinity of geothermal steam sources.

Referring now again to FIG. 2, the concrete outer portion 21 of the tank may be integral with a foundation 23 and a floor 24 which slopes to a drain outlet 26 through which sludge may be periodically drained from the tank through a sludge discharge conduit 27 and valve 28. Preferably, the tank 17 is also provided with a roof 29 having a vent outlet 31 for preventing a pressure build up when waste water and steam are brought into the tank.

Waste water may be admitted into the tank 17 to begin a sterilization cycle through a valve 32 and water supply conduit 33 that extends through the tank wall 18. The waste water may be brought to tank 17 from a nearby city sewage system for example by gravity flow if possible or with the aid of pumps preferably of a steam operated form to be hereinafter described which accomplishes a preheating of the waste water.

Following the filling of the tank with waste water, the sterilization and steam condensation step requires the injection of steam discharged from a turbine 13 that drives a generator 14 delivering electrical power to a utility power distribution system 34 as previously described. While the steam may be injected into the tank 17 through fixed outlets distributed around the wall 17 thereof and preferably oriented at different angles to create turbulence, FIG. 2 depicts a steam injection mechanism 36 which promotes more rapid and uniform heating and faster steam condensation than is accomplished with fixed nozzles. The discharge steam from turbine 13 is transmitted to a housing 37 at the center of floor 24 through an insulated conduit 38 and steam control valve 39. A hollow rotatable tube 41 extends upwardly from housing 37 along the central axis of the tank 17 and is supported at the upper end by a bearing 42. Tube 41 has a conical flange 43 at the upper end, within the bearing housing 44, which rides against roller bearing elements 46. Housing 44 is itself supported by three arms 47 which extend to the wall 18 of the tank near the top thereof. The lower end of rotatable tube 41 extends a small distance into the lower housing 37, through a seal 48 and an additional bearing 49 mounted therein, to receive steam from conduit 38.

To distribute injected steam within the water volume while also creating turbulence to promote mixing, vertically spaced apart rotatable spray arm mechanisms 51 are secured to tube 41 at intervals along the length thereof within the tank 17. Each such spray arm mechanism 51 includes a hollow collar 52 secured coaxially to tube 41 and communicated with the internal steam passage 53 of the tube. Hollow tubular spray arms 54 extend from each collar 52 toward the wall 18 of the tank, two such arms being extended in opposite directions from each collar 52 in the present example of the invention as best seen in FIG. 3 in particular. The arms 54, which are angled in this example, have steam ejection apertures 56 spaced apart along the length of the arms and preferably include an aperture 56' at the end of each arm to direct steam toward tank wall 18. Aside from the aperture 56', the apertures 56 are all situated on the same side of the associated arm 54 thereby causing the reaction force from the ejected steam to create a torque which rotates the tube 41 and spray arms about the axis of the tank 17 to continuously move the points of steam injection within the water volume while also creating turbulence therein.

When the water within the tank 17 has been heated in this manner to a temperature suitable for killing living organisms in the water, steam injection may be stopped by closing the control valve 39. Under some conditions, the insulation in the walls of the tank may be adequate to maintain a sufficient water temperature for a sufficient period of time to accomplish the desired sterilization. Where conditions do not allow this, the valve 39 may be temporarily reopened at intervals during the holding period to add additional heat as necessary. Monitoring of the temperature for this purpose may be facilitiated by mounting suitable temperature sensing means 57 of any of various known forms at the inside of the tank wall 18.

Following the holding period, the sterilized water may be withdrawn from the tank 18 by means of a conduit 58 which communicates with the lower portion of the tank through a valve 59. The discharged and usually nutrient rich water may then be used for crop irrigation or other purposes. The initially high heat content of such water will tend to drop in passage to distant farm land to be irrigated and if necessary the water may be temporarily stored in open reservoirs until sufficient cooling occurs. However, some residual heat content may be advantageous for agricultural purposes. For example, by flooding orchards of frost sensitive crops with such warm sterilized water, smudging, wind machines or other operations for preventing frost damage in cold weather may be eliminated.

Following draining of a tank 17 as described above, valve 32 may be reopened to recharge the tank with contaminated waste water and a subsequent cycle of operation may then begin.

From the power generation standpoint, the embodiment of the invention described above is of the type in which steam discharged from the power generation operation need not be condensed for recycling through boilers and turbines. From the water treatment point of view, it is a system of the type which recovers contaminated sewage water for reuse. The techniques of the invention are by no means confined to these specific installations and operations. Referring to FIG. 4, another integrated electrical power production and water processing facility 58 is shown which operates to assure the sterility of fresh water en route to a city or other utility water distribution system and wherein the electrical power generation station 59 may be of the common form which is dependent upon combustion of fossil fuel such as oil or coal as an energy source. In these fossil fueled generating stations, it is the common practice to condense the steam that is discharged from turbines and to recycle the condensate through boilers. This has required costly equipment which has heretofore served no purpose except to condense steam while disposing of the thermal energy.

The facility 58 of FIG. 4 may reduce or eliminate the need for chlorination of city utility water supplies. It has recently been recognized that the common practice of chlorinating city water may have harmful effects. While chlorine is not introduced into utility water systems in sufficient amounts to be harmful in its original form and may be rapidly released, it is now believed that in the temporary presence of such chlorine contributes to the formation and gradual accumulation of other chemical compounds in water supplies which may themselves be harmful. The production of chlorinated hydrocarbons may be enhanced and this class of compounds is known to include many substances toxic to humans and other living organisms. Many pesticides, for example, are chlorinated hydrocarbons. Thus, in addition to dispensing with the cost and complication attendant on chlorination, the facility 58 may have further beneficial effects in reducing the exposure of humans and other living organisms to toxic substances.

The power generation station 59 of FIG. 4, considered apart from other elements of the system, may be of conventional construction and thus salient components are indicated only schematically in FIG. 4. Typically, such a power generation station has one or more steam turbines 61 driving one or more alternators 62 which are coupled to an electrical utility power distribution system through step up transformers 63. If desired, transformer requirements may be reduced or eliminated by utilizing the techniques disclosed in co-pending application Ser. No. 505,787 of Morris R. Jepson filed Sept. 13, 1974 and entitled ELECTRICAL POWER GENERATION AND DISTRIBUTION SYSTEM.

Steam for operating the turbines 61 is obtained from one or more boilers 64 which may be fired by any of the known fossil fuel sources such as fuel oil, coal, natural gas or the like. The steam and water circuit in generating stations of this type is generally a closed system in which steam from the discharge conduit 66 of the turbine is cooled and condensed into water which is returned to the boiler 64 through a condensate pump 67. Pump 67 may be driven by an electrical motor 68 operating from electrical power supplied from the output of the generating station alternators 62. Thus the waste product which has heretofore presented a costly disposal problem in generating stations of this kind is not steam as such but rather the very sizable amounts of heat which must be extracted from the steam in the condensation process. The present facility 58 resolves that problem by reducing or dispensing with the use of conventional cooling towers or the like and by recovering such heat for useful purposes.

In particular, the facility 58 includes a fresh water conduit 69 which forms a link in the flow path from a city water source 71 such as a reservoir, river, wells or the like to the utility water distribution system 72 of the community. Although conduit 69 may be an aqueduct, in the present example it is a covered canal which, as best seen in FIG. 4A, may have a thick concrete lining 73 and a cover 74 preferably formed of a high strength thermal insulation material of which thick slabs of reinforced concrete are one example although other materials may also be used.

Referring now to FIGS. 4 and 4A in conjunction, first and second manifold structures 76 and 77 respectively are situated in conduit 69 at spaced apart locations along the conduit and support a number of spaced apart heat exchange tubes 78 which extend between the two manifolds within the water flow. The first or upstream manifold 76 receives the discharge steam from turbine discharge conduit 66 and distributes such steam to the heat exchange tubes 78 wherein the steam is cooled and condensed by heat transfer to the surrounding water. The second or downstream manifold 77 receives the liquid condensate from tubes 78. A condensate pipe 79 communicates manifold 77 with the intake of pump 67 which returns the condensate under pressure to boiler 64 for recycling.

Referring to FIG. 4A in particular, the manifold structures, such as manifold 76, have sizable openings 81 to avoid any significant blockage of the utility water flow through the conduit canal 69.

Heat exchange tubes 78 are made sufficiently long in relation to the initial temperature and the rate of flow of water through conduit 69 and to the heat content of discharge steam from generating station 59 to cause the water flow to be heated to sterilizing temperatures of the magnitude hereinbefore described, and to be maintained at such temperatures for a period sufficient to accomplish the desired water sterilization. In this connection, it should be observed that the conduit 69 in the region of the heat exchange tubes 78 and preferably for a distance downstream therefrom, is preferably formed of thermally insulative materials such as thick concrete or the like, and thus the sterilizing temperature will be maintained in the water flow for a distance downstream from the heat exchange tubes 78 inasmuch as water cooling proceeds very slowly in a well insulated conduit. Thus, the heat exchange tubes 78 do not necessarily have to extend along a length of the conduit 69 equal to the distance that water travels during the period required for sterilization.

Insofar as electrical power generation is concerned, the facility 58 of FIG. 4 reduces or eliminates use of conventional steam condensers, cooling towers and the like, and disposes of discharge heat in a productive manner. From the water treatment point of view, the facility very efficiently an simply accomplishes sterilization of a municipal water supply or the like, reducing or eliminating chloriation requirements including the costs, equipment and possible hazards associated with chlorination.

The heat transferred to the water flow may, if desired, be recovered and utilized still again for such purposes as heating buildings or preventing freezing of frost-sensitive agricultural crops. Downstream from the generation station 59, additional heat exchange tubing 82 may be disposed within the canal or conduit 69 and a pump 83 may be utilized to circulate water through the tubing 82 and through a pipe 84 and return pipe 84' which carry the pumped water to regions where heating is required. For example, the pipe 84 carrying the warmed water may pass through orchards 86 such as citrus orchards or the like which must be protected from severe freezing and heat radiated from the pipe will accomplish this purpose. Alternately, water heated by passage through the heat exchange tubing 82 may be passed through the orchard 86 in open canals or if an ample supply of water is available for such purposes that it need not be recycled to the heating exchange tubing, such warmed water may simply be used to flood the area of orchard 86 during cold weather. The recovered heat may also be utilized by passing a portion of the recirculating heated water flow through heat radiating coils 87 situated in greenhouses 88, for example, by connecting such coils between pipes 84 and 84' through control valves 89.

The embodiments of integrated power generation and water treatment facilities that have been described to this point included power generation stations which, considered separately from the rest of the systems, are of essentially known form. However, the principles of the invention may also be adapted to facilities which do not use steam turbines to drive generators, but which nevertheless are dependent on steam supplies as the primary source of energy. FIG. 5 depicts such a facility 91 which is operated by steam from geothermal wells 92. The system of FIG. 5 is adaptable to making use of geothermal steam wells which may not be suitable for the efficient production of electrical power utilizing steam-driven turbines of such reasons as low volume or energy content of available steam or the presence of corrosive contaminants which tend to rapidly deteriorate turbine components.

Basically, the facility 91 operates by utilizing steam energy to pump or lift water from a lower reservoir 93 to a upper reservoir 94 and by then utilizing the elevated water to drive a hydroelectric power generation station 96. If desired, the water which is lifted between the reservoirs may be waste water from a municipal sewage system which is supplied to the lower reservoir through a pipe 97, and the waste water is heated and sterilized in the course of being transferred from the lower to the upper reservoir. The sterilized water may then be recovered from the hydroelectric generation station 96 and utilized for crop irrigation or other purposes.

The hydroelectric power generation station 96, considered apart from the rest of the structure, may be of conventional construction and thus may have one or more water-driven turbines 98 driving one or more electrical generators 99 to produce the electrical power. Station 96 is situated below the upper reservoir 94 and a pipe 101 extends from the upper reservoir to the inlet of turbines 98 to supply high pressure driving water thereto. The discharge from turbine 98 may be directed to a sterilized water delivery conduit 102 through a valve 103 or, if it is necessary due to an inadequate supply of incoming waste water, may be returned to the lower reservoir 98 through a discharge outlet 104 by operating valve 103.

In order to pump water from the lower reservoir 93 to the upper reservoir 94, while also heating and sterilizing the water, the embodiment of the invention depicted in FIG. 5 utilizes a series of primary water pumping tanks 106A, 106B and 106C which are situated at progressively higher elevations between the two reservoirs. Where water sterilization is to be accomplished, a series of holding tanks 107 of which two are depicted in FIG. 5, are situated above the uppermost pumping tank, preferably just slightly above the elevation of upper reservoir 94. A water delivery pipe 108 extends from the bottom of each pumping tank 106 to the top of the next higher one of the pumping tanks, through an associated one of a series of flow shutoff valves 109.

The water delivery pipe 108C from the uppermost of the pumping tanks 106C communicates through the associated shutoff valve 109C with a multi-position valve 111 for directing water from tank 106C to any selected one of the holding tanks 107. The lowermost pumping tank 106A has a water intake pipe 112 communicating the upper portion of the tank with lower reservoir 93 through a shutoff valve 113. In order to realize one of several alternate modes of operation which will hereinafter be described, each pumping tank 106 may also be provided with a steam vent valve 114.

A steam supply conduit 116 collects high pressure steam from one or more of the geothermal wells 92. Steam from supply conduit 116 may be admitted to each of the pumping tanks 106 by opening an associated one of a series of steam supply valves 117 to communicate the supply conduit with the pumping tank through an associated one of a series of steam injection pipes 118.

Considering now one mode of operation of the pumping system, the lowermost pumping tank 106A may in some instances be situated below the level of the lower reservoir 93, in which case it may be filled with water from the lower reservoir by gravity flow upon opening of water supply valve 113. But in this example, the lowermost pumping tank 106A is situated slightly above the level of the lower reservoir, not more than about 32 ft. (9.75M), and is filled by vacuum suction. For this purpose, steam supply valve 117A may be opened to fill the pumping tank 106A with steam, after which the valve 117A is then closed. Upon condensation of the steam in the pump tank 106A a vacuum is created. Valve 113 is then opened, to draw water into the lower pumping tank 106A. Techniques for accelerating steam condensation for this purpose will be hereinafter described.

After the lowermost tank 106A is filled with water, valve 113 is closed, water delivery valve 109A is opened and steam supply valve 118A is reopened. High pressure steam then enters the pumping tank 106A and forces the water upwardly through delivery pipe 108A into the next higher pumping tank 106B. Upon completion of this step, valve 109A is reclosed and steam vent valve 114A at the lower tank 106A may be temporarily opened to release the high pressure steam from the lower tank in preparation for a subsequent cycle of operation.

The water is next lifted to the still higher pumping tank 106C by an essentially similar process. In particular, water delivery valve 109B and steam supply valve 117B are opened, and the resulting steam pressure entering pumping tank 106B forces the water upward through delivery pipe 108B to the highest pumping tank 106C. Valves 109B and 117B are then closed and steam vent valve 114B is temporarily opened to relieve the pressure within pumping tank 106B, readying that tank for the next cycle of operation.

The water is then lifted again to a selected one of the holding tanks 107 by similar operations in which delivery valve 109C and steam supply valve 117C is opened until steam pressure has driven the water from tank 106C to the holding tank 107, after which the valves 109C and 117C are reclosed and steam vent valve 114C is temporarily opened to relieve the steam pressure in tank 106C. The sequence of operations may then be repeated continuously to lift additional volumes of water from the lower reservoir to holding tanks 107 in a similar manner. It will be apparent that lesser or greater numbers of the pumping tanks 106 may be employed, depending on the elevational difference between the two reservoirs in relation to the available steam pressure. As has been pointed out, where vacuum suction is relied upon to fill the lowermost tank 106A, that tank cannot extend more than about 32 ft. (9.75M) above the level of the lower reservoir. However, the distances $h2$, $h3$ and $h4$ between the others of the pumping tanks can in general be much greater, depending on the available steam pressure. Distances between pumping tanks of the order of 200 to 500 ft. (91 to 152M) are typical.

Substantial heating of the water may occur in the process of being lifted through the series of pumping tanks 106 because of the presence of steam in the tanks at certain stages of the pumping operation. Under some circumstances, such heating may be sufficient to raise the temperature of the water to the sterilizing temperatures hereinbefore discussed. Should the temperature of the water delivered to the holding tanks 107 not be sufficient for sterilizing, the water may be further heated by injecting steam directly into the holding tank. In this example, a steam injection valve 119 is connected between the holding tank and the uppermost pumping tank stream injection pipe 118C for this purpose.

A plurality of the holding tanks 107 are provided so that upon filling of one, the waste water therein may be held at the elevated temperature for periods required to assure sterilization as hereinbefore discussed, and during the holding period, pumped water may be directed to another of the holding tanks of operation of valve 111. Following completion of the holding period at any particlar holding tank 107, a water release valve 121 connected to the tank may be temporarily opened to drain the sterilized water to the upper reservoir 94. In many installations, additional series of the primary pumping tanks 106 and holding tanks 107 may be provided so that an adequate input of sterilized water into the upper reservoir 94 is realized to accomplish continual operation of the hydroelectric generating station 96.

Accordingly a first portion of the energy content of steam from wells 92 is utilized to lift water and is then ultimately recovered in the form of electrical energy, while another portion of the energy content of the steam is utilized to heat the water for sterilizing purposes.

The mode of operation described above involves repetitively venting high pressure steam from the several pumping tanks by opening of the steam release valves 114. Thus, still another significant portion of the energy content of the steam is not used and may in some circumstances have an undesirable effect in that the sudden release of high pressure steam in batches causes a substantial amount of noise. Accordingly, FIG. 5 depicts additional systems which may be provided to reduce or eliminate the need for venting a significant amount of steam, while recovering and utilizing still more of the energy content thereof. The installation as shown in FIG. 5 in fact provides four different ways in which the high pressure steam charges which remain in the pumping tanks after water has been forced to the next higher tank, may be utilized for productive purposes.

First, a steam reuse valve 121 may be connected between the steam injection pipes 118 of each adjacent pair of pumping tanks 106. At the stage of operation at which a particular pumping tank, such as tank 106A, has been emptied of water but remains charged with high pressure steam, the steam supply valve 117B of the next higher pumping tank may be temporarily left closed while the steam reuse valve 121A between those two tanks is temporarily opened. The high pressure steam is then discharged from the lowermost tank 106A and enters the next higher tank 106B to begin the forcing of water therefrom up to the still higher tank 106C. When the available steam energy from tank 106A has been exhausted, steam reuse valve 121A is reclosed, while steam supply valve 117B is reopened to finish the forcing of water from tank 106B to tank 106C in the manner described above.

A second method of utilizing the steam which must be removed from a pumping tank 106 is to use such steam for the final heating of the water in holding tanks 107. For this purpose, all steam reuse valves 121 above the tank from which steam is to be released may be opened while valve 119 is also opened to direct such steam into the holding tank. A third method of reusing the steam charge remaining in a pumping tank 106 accomplishes aeration of the sterilized water in the holding tanks 107, since the air content of water tends to be driven out by the high pressure steam pumping system. For this purpose, all steam reuse valves 121 above the tank to be vented may be temporarily opened, prior to opening of the steam supply valve 117 of the next higher tank, to deliver the vented steam to a turbine 122 through a temporarily open shutoff valve 123. Turbine 122 drives an air compressor 124 which injects air into the holding tanks 107 through a valve 126. The intake of turbine 122 may also be connected to the primary steam supply conduit 116 through another shutoff valve 127 to provide an alternate source of steam for driving the turbine during periods when discharge steam is not available from a pumping tank 106.

Finally, if undesirable contaminants are absent from the steam, the discharge from the pumping tanks 106 may be condensed and recovered as fresh water for utility use. For this purpose, one or more heat exchangers 128 may be disposed at the pipe 101 which delivers the water from upper reservoir 94 to hydroelectric generating station 96. A separate steam discharge valve 129 is connected between the steam injection pipe 118 of each pumping tank 106 and a condenser 128. Thus, valves 129 may be temporarily opened when the associated tank 106 is to be vented and the discharge therefrom will be condensed in heat exchangers 128 and delivered to a utility water line 131.

The several different ways described above for utilizing the charge of high pressure steam which remains in a pumping tank 106 after water has been forced therefrom are only partially effective to recover the energy content of such steam. After discharge of the pumping tank, a volume of steam having at least one atmosphere of pressure still remains in the tank. This residual steam volume may itself be utilized to enhance the pumping proces. By condensing such steam, a temporary vacuum may be created in the tank which aids in lifting water from the next lowermost tank during the next fill cycle. FIG. 6 illustrates a tank construction which facilitates this process. In particular, the water delivery pipe 108B through which water is received from the next lowermost tank as described above, may connect with an annular water distribution ring 132 which is disposed around the top circumference of the tank. As best seen in the enlarged portion of FIG. 6, ring 132 is hollow to distribute water around the wall 133 of the tank, and has a large number of small injection apertures 134 distributed about the circumference of the tank to cause incoming water to flow down the inner side of tank wall 133 and thereby accelerate condensation of steam in the tank. Referring again to FIG. 5, condensation of the residual steam to produce a temporary vacuum may be further accelerated by spraying water under pressure into the tank. For this purpose, a water pump 136 may be driven by turbine 122 to draw water from upper resevoir 94, and to deliver pressurized water to a high pressure water conduit 137. One of a series of water spray injection valves 138 is connected between conduit 137 and each individual one of the pumping tanks 106 and may be temporarily opened to promote steam condensation at the stage of the pumping cycle described above.

Considering now suitable constructions for the pumping tanks 106 in greater detail, some loss of potential efficiency in recovering the energy content of steam is present if the steam is simply admitted into the pumping tanks in contact with the water for the purpose of forcing the water out and up to the next pumping tank. This efficiency drop is caused by steam condensation resulting from contact with the relatively cool water in the tanks. While this efficiency loss may be acceptable in many situations, particularly if ample supplies of high temperature steam are available, in other circumstances it may be desirable to minimize such losses. FIG. 7 illustrates an alternate construction for a pumping tank 106D which reduces steam condensation while water is being forced from the tank to the next higher tank through a water delivery pipe 108D by steam pressure which is being admitted through a steam injection pipe 118D as previously described.

This objective may be accomplished in part by forming the wall 133D of the tank of thermally insulative material and in part by isolating the steam from the water volume 139 within the tank by a float structure 141. Float 141 may, for example, be a thin walled, hollow, fluid tight stainless steel structure having a convex upper surface so that water will not accumulate thereon. The circumference of the float 141 should conform to the configuration of the wall of the tank so that steam in the upper portion of the tank is substantially isolated and thermally insulated from the water in the lower portion of the tank to minimize heat exchange therebetween. A weight 142 may be contained in the bottom portion of the float 141 to assure that it remains in a stable floating relationship on the water, and rises and falls in the tank with the changes of water level.

To facilitate an understanding of the operation of the system of FIG. 5, the description given above identified the steps involved in lifting a single charge of water through the several pumping tanks 106. Pumping rate may be enhanced, in practice, if pumping of each subsequent charge of water is initiated at the lowermost tank while the previous charge of water is being forced out of the next higher tank. Thus, as shown graphically in FIG. 5A, at a particular point in time $t_1$ tank 106C may be receiving a charge of water which is being forced out of tank 106B while tank 106A is filling with the next charge of water. At a subsequent point in time $t_2$, water is being forced out of tank 106A into tank 106B while the previous charge of water is being forced out of tank 106C to the holding tanks. The gradual transistions shown graphically in FIG. 5A following each pumping period at each tank represent the periods when the residual charge of high pressure steam in the tank is being vented, condensed or salvaged for other operations as previously described.

As will be apparent, operation of the system of FIG. 5 can be facilitated if the many valves present in the system are of the form that can be controlled from a single central location and an automatic valve cycling system may be provided if desired.

Several methods have been described above for utilizing the high pressure steam which remains in a pumping tank 106 after delivery of the water therefrom to the next higher tank. It is also possible to use the substantial energy content of such steam for the pumping of additional water between the reservoirs. A pumping tank system as modified for this purpose is depicted in FIG. 8.

In FIG. 8, vertically spaced apart pumping tanks 106E and 106F form a pumping system for lifting water from a lower reservoir 93' to a holding tank 107' essentially in the manner hereinbefore described, and pumping tanks 106G and 106H represent a similar parallel system for also lifting water from the lower reservoir to the holding tank in the same manner. Thus, steam from a geothermal well 92' may be admitted to tank 106E through an injection pipe 118E by opening a steam supply valve 117E which connects with the well through a steam control valve 143E. Valves 143E and 117E may then be closed, and a water supply valve 113E may be opened. Upon condensation of the steam in tank 106E, water is drawn into the tank from reservoir 93' by vacuum suctin. Valve 113E may then be closed while water delivery valve 109E is opened and steam supply valve 117E is again opened, causing high pressure steam to enter the tank 106E to force the water upwardly through delivery pipe 108E to the upper tank 106F. Thereafter, steam may be admitted to the upper tank 106F by opening the steam supply valve 117F to admit steam from well 92' through another steam supply valve 143F and a steam supply conduit 144. Water delivery valve 109F is also opened and thus the steam pressure causes the water in the tank 106F to pass upwardly through water delivery conduit 108F to the holding tank 107'. The other primary pumping system defined by the pumping tanks 106G and 106H may be operated in a similar manner to lift water from the reservoir to the holding tank.

In the previously described embodimennt, steam was vented from the pumping tanks 106 following delivery of the water therefrom, or in other modes of operation was used elsewhere in the system for such purposes as heating water or driving a turbine. In the present embodiment of FIG. 8, such exhaust steam is used to operate a secondary water pumping system through an additional series of pumping tanks 106J, 106K, 106L and 106M spaced at progressively higher elevations between the reservoir and the holding tank, but having a lesser vertical spacing from each other than the primary pumping tanks 106E to 106H. Typically, there may be twice as many pumping tanks 106J to 106M, although the precise number may be varied as determined by the available exhaust steam pressure from the primary tanks 106C to 106H.

Aside from utilizing steam exhausted from the primary tanks instead of steam obtained directly from the wells 92, the secondary pumping system defined by the tanks 106J through 106M operates in an essentially similar manner to that previously described. Thus, the lowermost of the secondary pumping tanks 106J is initially filled with water from reservoir 93' by opening valves 118J and 143G to charge the tank with steam. Valve 118J is then closed while water supply valve 113J is opened. Upon condensation of the steam in the tank, which may be assisted by the condensation accelerating techniques heretofore described, the resulting vacuum draws water upwardly into the tank. Water supply valve 113J is then closed, while water delivery valve 109J is opened.

At the completion of a pumping cycle at the adjacent primary pumping tank 106G, valves 118J and 117G are temporarily opened and the high pressure steam charge within tank 106G expands into tank 106J to drive the water therein upwardly through delivery pipe 108J to the next higher secondary pumping tank 106K. Valve 109J is reclosed while valve 109K is temporarily opened. At the completion of a pumping operation at the other primary tank 106E, steam pressure therein is transmitted to secondary pumping tank 106K by temporarily opening valves 117E and 117K, thereby driving the water in tank 106K still further upward through delivery pipe 108K to the next higher secondary pumping tank 106L.

Similar operations are repeated to lift the water from secondary pumping tank 106L to the highest pumping tank 106M and then from tank 106M to the holding tank 107' utilizing the steam pressure from the primary pumping tank 106H to drive water upward from secondary pumping tank 106L and using steam from tank 106F to lift the water from secondary pumping tank 106M to the holding tank.

It will be apparent that a still more complex system may be designed, utilizing a tertiary set of pumping tanks vertically spaced apart still lesser distances than the spacing of the secondary tanks 106J to 106M and utilizing the discharge steam pressure from the secondary tanks to lift water in stages through the smaller vertical spacings. This technique may be extended to provide still more columns of pumping tanks, each having a progressively smaller vertical spacing between tanks and each utilizing the discharge steam pressure from a preceding column of pumping tanks, but a point is reached at which the cost and complications of providing still another more closely spaced column of pumping tanks are not justified by the progressively smaller pumping rate through each such successive column.

Insofar as the conversion of steam energy into electrical power is concerned, the system described with reference to FIGS. 5 to 8 is somewhat less efficient than a conventional steam turbine driven power station, but there are offsetting factors which make the facility 91 more desirable under certain conditions. These include the capability of recovering waste water which would otherwise present a disposal problem, and the conversion of such water into a valuable product for crop irrigation or the like. Further, the need for cooling towers and cooling water or other conventional steam condensation means may be reduced or eliminated. Another advantage of the system is that use may be made of the energy of geothermal steam wells which are not fully suitable for driving conventional steam-driven turbine-driven generators because of low steam volumes, low thermal energy content or the presence of corrosive contaminants. Steam wells subject to these problems are often found in desert areas which are also regions of water scarcity and thus this form of facility may be highly suited for locations of this kind, particularly if there is a source of sewage waste water sufficiently close that it may be brought to the facility.

Because of the capability of operating the installations depicted in FIGS. 5–8 from steam sources that may not be fully suitable for conventional steam turbine-driven power stations, there may be some instances where such facilities are desirable for power production alone, and wherein the production of sterilized water is not required. Under those circumstances, the holding tanks 107 may be dispensed with. Water from the uppermost pumping tanks may be delivered directly the upper reservoir and the discharge from the power generating station hydroelectric turbines may be returned to the lower reservoir for reuse in the installation.

The water treatment and power production facilities described with reference to FIGS. 5 to 8 use steam energy to elevate water through a series of vertically-spaced pumping tanks. There are alternate means which may also utilize such steam energy to pump water while heating or at least preheating the water. FIG. 9 illustrates a first such water pumping means.

In the apparatus of FIG. 9, water which is to be pumped uphill or horizontally according to the requirements of the particular usage flows in the direction of arrows 146 through pipe sections 147 and a rotary mechanical pump 148 and a tubular steam injection housing 149 are connected between two sections 147 of the water pipe to form a portion of the flow path therethrough. In particular, pump 148 may have a fluid intake 151 coupled to the upstream waterpipe section 147 and an outlet 152 coupled to one end of steam injection housing 149. The opposite end of the steam injection housing is coupled to the downstream section 147' of the water pipe.

Rotary pump 148 may be of any of the various known types, such as a centrifugal pump, a rotary sliding vane pump or a radial piston pump, for example, and is driven by a steam turbine 153. Turbine 153 has a steam inlet 154 coupled to a steam supply conduit 156 which receives high pressure steam from a well, power station turbine discharge or other source. A discharge pipe 157 connects the steam outlet 158 of the turbine with one or more steam injection nozzles 159 situated within housing 149. Preferably, the nozzle 159 is oriented to inject steam into the water flow through housing 149 in the direction of water flow therethrough.

In operation, water is forced through pipe 147 by pump 148 and is also heated as the injected steam condenses, If nozzle 159 is oriented in the direction of water flow, the pumping action of pump 148 is supplemented by a jet pump effect. The pump, turbine and steam injection housing combination may be repeated at intervals along the flow path 146 where a single unit is insufficient to accomplish the desired pumping action.

FIG. 10 illustrates another combined water pumping and heating system utilizing steam energy. In the apparatus of FIG. 10, water flows through a conduit 161 in the direction of arrows 162 and tubular steam housings 163 are disposed coaxially around the conduit 161 at spaced apart intervals there along. Housings 163 are of larger diameter than conduit 161 to define fluid-tight steam chambers 164 around the exterior surface of the conduit. High pressure steam is admitted into the chambers 164 from a steam supply pipe 166 which may extend parallel to the water conduit 161. Preferably, a shutoff valve 167 is provided between the steam pipe and each steam housing. Within each housing 163 means are provided to inject steam from chamber 164 into conduit 162 in the direction of water flow therethrough, and in this example such means include a large number of steam injection nozzles 168 transpierced through the wall of the conduit and oriented to direct steam into the water in the direction of flow.

In some circumstances, components of the water pumping and heating apparatus of FIGS. 9 and 10 may be advantageously combined as shown schematically in FIG. 11, Thus, tubular steam housings 163' may be disposed around a water conduit 161' at spaced apart intervals therealong, each such housing containing steam nozzles 168' transpierced through the wall of the water conduit and oriented to direct steam into the water in the direction of flow through the conduit. One or more rotary mechanical pumps 148' may be connected between sections of the water conduit to form a portion of the flow path and may be driven by steam turbines 153'. The discharge steam from the turbines is then transmitted to the housings 163' through control valves 167'. Thus, a combination of mechanical pumping and steam ejection pumping, accompanied by heating of the water flow and a condensation and recovery of the steam is realized.

Certain embodiments of the invention described above utilize different portions of the energy content of the steam to accomplish water sterilization, electrical power production and the pumping or transport of water, in a single installation. As has been pointed out, there are circumstances where only two or in some cases one of these operations may be of interest and the installations may be modified accordingly to dispense with components which are involved only in the unneeded operations. Many other modifications are possible and it is not intended to limit the invention except as defined in the following claims.

What is claimed is:

1. A process integrating power production and water treatment, comprising:
   bringing unsterilized water into proximity to an electrical power generating station of the form operated from a source of steam;
   converting a first portion of the energy content of said steam to electrical energy in said power generating station;
   utilizing another portion of said energy content of said steam to heat said unsterilized water to a temperature range at which living organisms therein are destroyed, said temperature range being below the boiling point of said unsterilized water;
   maintaining said water in liquid condition at said temperature range for a period of time sufficient to sterilize said water, said step of maintaining said water at said temperature range being accomplished at least in part by restricting the conduction of heat away from said water; and
   delivering said sterilized water to a water distribution system.

2. The process of claim 1 comprising utilizing said steam to heat said unsterilized water to a temperature which is at least about 160° F. (71° C.) and which is less than about 212° F. (100° C.).

3. The process of claim 2 wherein said water is maintained at said temperature for a period of at least about thirty minutes.

4. The process of claim 1 comprising the further step of recovering heat from said sterilized water and transferring said recovered heat to an area which is to be heated.

5. The process of claim 4 further comprising utilizing said recovered heat to warm agricultural crops.

6. The process of claim 1 further comprising discharging steam from said electrical power generating station directly into said unsterilized water to heat said water while condensing said steam.

7. The process of claim 6 further comprising the step of facilitating recovery of the energy content and water content of said steam by injecting said steam directly into said unsterilized water at a plurality of spaced apart injection points therein and moving said injection points within the water volume.

8. The process defined in claim 1 further comprising:
sequentially directing said unsterilized water to individual ones of a plurality of thermally insulated water holding tanks in a repetitive sequence;
transferring heat energy from said steam to the water within individual ones of said holding tanks in a repetitive sequence after utilizing said steam for generating said electrical power; and
withdrawing said sterilized liquid water from individual ones of said tanks in a repetitive sequence, wherein said withdrawal of liquid water from each individual tank is performed after elapse of said period of time sufficient for sterilizing said water.

9. The process defined in claim 1 further comprising utilizing said steam to heat said unsterilized water while preventing direct contact therebetween.

10. The process defined in claim 9 further comprising condensing said steam by heat transfer to said unsterilized water to produce steam condensate, and returning said condensate to steam boilers which supply said electrical power generation station.

11. The process defined in claim 1 comprising the further step of utilizing a portion of the energy content of said steam to pump said unsterilized water.

12. The process defined in claim 1 wherein said first portion of said energy content of said steam is used to pump said unsterilized water to an elevated region and wherein said first portion of said energy is recovered as said electrical power by directing said water from said elevated region to a hydroelectric power generation station.

13. The process defined in claim 12 comprising the further step of directing water discharged from said hydroelectric power generation station to a crop irrigation system.

14. A process for recovering waste water while producing electrical power comprising:
supplying steam to a turbine driven electrical power generation station including discharging steam from said turbine;
sequentially charging individual ones of a plurality of thermally insulated water holding tanks with said waste water;
sequentially directing said discharged steam from said turbine into individual ones of said holding tanks to heat said waste water therein to sterilizing temperatures which temperatures are below the boiling point of said water;
holding said heated water in each of said tanks at said temperatures for a period of time sufficient to sterilize said heated water in liquid condition;
sequentially withdrawing sterilized liquid water from said holding tanks following said holding period; and
continuously repeating said sequential charging, heating, holding and liquid water withdrawal at said holding tanks.

15. A process for simultaneously producing electrical power and sterilizing water for distribution to a utility water system comprising:
generating said electrical power by producing steam in a boiler and directing said steam to a turbine driven generator;
directing a flow of said water through a conduit which passes in proximity to said turbine driven generator;
directing discharge steam from said turbine into heat exchanging relationship with said water while maintaining said steam in a separate flow path from that of said water to heat said water to sterilizing temperatures below the boiling point of said water while condensing said steam to condensate;
returning said condensate to said boiler, and
maintaining said water in liquid condition at said sterilizing temperatures for a period of time sufficient to sterilize said water, said step of maintaining said water at said sterilizing temperatures being accomplished at least in part by restricting the conduction of heat away from said water.

16. A process for simultaneously producing electrical power and sterilizing and reclaiming waste water utilizing the energy of steam from a steam well comprising:
utilizing a portion of the energy of said steam to pump said waste water upwardly to an elevated location;
utilizing another portion of the energy of said steam to heat said waste water to sterilizing temperatures below the boiling point of said waste water;
maintaining said waste water in liquid condition at said temperatures for a period sufficient to accomplish sterilization thereof, the step of maintaining said waste water at said sterilizing temperatures being accomplished at least in part by restricting the conduction of heat away from said waste water; and
returning said sterilized waste water to a lower location through hydroelectric power generation means.

17. Apparatus integrating the production of electrical power and water treatment comprising:
a source of steam;
power generation means for converting a first portion of the energy content of steam from said source to electrical energy;
conduit means for carrying unsterilized water into proximity to said power generation means;
means for utilizing another portion of the energy content of said steam to heat said unsterilized water to sterilizing temperatures which are below the boiling point of said water, and
thermally insulative containment means for maintaining said water in liquid condition at said temperatures for a period of time sufficient to destroy living organisms therein.

18. The combination defined in claim 17 further comprising means for utilizing still another portion of said energy content of said steam to pump said water.

19. The combination defined in claim 17 wherein said means for heating said unsterilized water comprises means for directing discharge steam from said power generation means into heat exchanging relationship with said water.

20. Apparatus for producing electrical power while recovering waste water, utilizing steam from at least one steam well, comprising:
an electrical power generation station having at least one turbine driving at least one electrical generator and having means for transmitting steam from said steam well to said turbine and for transmitting discharged steam therefrom;
means for bringing said waste water into proximity to said electrical power generation station; and
means for injecting discharge steam from said power generation station directly into said waste water to heat said water to sterilizing temperatures below the boiling point of said water while condensing said steam; and thermally insulative means for holding said water at said temperatures in liquid form for a period sufficient to sterilize said water.

21. The combination defined in claim 20 further comprising at least one thermally insulated holding tank disposed in proximity to said power generation station for receiving and temporarily holding said waste water while said steam is injected therein.

22. The combination defined in claim 21 wherein said means for injecting discharge steam comprises:
a steam transmitting tube extending within said holding tank;
thermally insulative steam conduit means extending from said turbine steam discharge means to said tube; and
at least one pair of hollow arms extending outward from said tube and being supported for rotation about the axis thereof, each having at least one steam injection aperture for injecting steam into the volume of water contained in said thermally insulated holding tank said steam ejection apertures being oriented to produce similarly directed reaction forces for rotating said arms about said axis to disperse steam within said water while creating turbulence therein.

23. The combination defined in claim 22 wherein said tank has an upright cylindrical configuration and wherein said tube extends vertically therein and is supported by bearing means for rotation about the axis of the tube, and wherein a plurality of said sets of arms are secured to said tube at vertically spaced apart positions thereon.

24. The combination defined in claim 21 wherein a plurality of said thermally insulated holding tanks are disposed in proximity to said power generation station, further comprising water valve means for directing said waste water to individual ones of said holding tanks in a repetitive sequence, steam valve means for directing discharge steam from said turbine to individual ones of said holding tanks in a repetitive sequence following said repetitive chargings of said tanks with said waste water, and means for withdrawing sterilized water from each individual one of said tanks in a repetitive sequence.

25. Apparatus combining the production of electrical power and the sterilization of water for a utility water distribution system comprising:
an electrical power generation station having at least one steam turbine driving at least one electrical generator and having a least one boiler for producing steam to drive said turbine;
water conduit means for bringing unsterilized water into proximity to said power generation station, said water conduit means having thermally insulative containment means for maintaining said water in liquid condition at sterilizing temperatures for a period of time sufficient to destroy living organisms therein;
heat exchange means disposed in said water conduit means and having a steam inlet and a steam condensate outlet;
a first steam pipe connected between said turbine and said heat exchange means for transmitting discharge steam from said turbine to said inlet of said heat exchange means for heating said water to sterilizing temperatures which are below the boiling point of said water; and
means for returning condensate from said outlet of said heat exchange means to said boiler.

26. The combination defined in claim 25 wherein said water conduit means is a closed thermally insulated water conduit extending adjacent said power generation station and wherein said heat exchange means comprises:
a steam intake manifold disposed at a first portion of said conduit and having openings enabling passage of said water through said intake manifold;
a condensate receiving manifold disposed in said conduit in spaced apart relation from said intake manifold and having openings enabling flow of said water through said condensate manifold; and
a plurality of tubular closed thermally conductive spaced apart heat exchanging tubes extending between said intake manifold and said condensate manifold through the water volume within said conduit.

27. The combination defined in claim 26 wherein said conduit means is thermally insulated in the region of said heat exchange means and the thermally insulated portion of said conduit means extends past said condensate manifold in the downsteam direction to maintain said water at an elevated temperature for a period of time following passage through said heat exchange means.

28. The combination defined in claim 25 further comprising a heat recovery heat exchanger disposed in said water conduit means downstream from said heat exchange means;
means for pumping a heat recovery fluid through said heat exchanger to recover heat from water in said downstream portion of said conduit; and
a pipe for transmitting said heat recovery fluid to an area to be heated.

29. The combination defined in claim 28 further comprising heat radiator means coupled to said pipe for receiving said fluid, said heat radiator means being disposed adjacent an agricultural crop.

30. Apparatus for producing electrical power from energy derived from a steam well and for sterilizing water for delivery to a water distribution system comprising:
a hydroelectric power generating station having at least one turbine driving at least one electrical generator;
pumping and sterilizing means utilizing a first portion of the energy of said steam to lift water to an elevated location above said hydroelectric station and utilizing another portion of the energy content of said steam to heat said water to sterilizing temperatures which are below the boiling point of said water;
thermally insulative containment means for maintaining said water in liquid condition at said temperatures for a period of time sufficient to destroy living organisms therein; and
means for directing said water from said elevated location to said hydroelectric station to drive said turbine.

31. The combination defined in claim 30 wherein said water is obtained from a sewage system further comprising:
means utilizing a second portion of the energy content of said steam to heat said sewage water to sterilizing temperatures.

32. The combination defined in claim 30 wherein said pumping means comprises:
- a plurality of vertically spaced apart primary pumping tanks;
- a first plurality of water delivery conduits each extending from a lower portion of a separate one of said pumping tanks to the next higher one of said pumping tanks through a separate one of a plurality of water valves;
- means for filling the lowermost of said tanks with water;
- a steam conduit extending from said steam well to each of said pumping tanks; and
- a plurality of steam supply valves each situated between said steam conduit and an individual one of said pumping tanks for selectively admitting steam to individual ones of said pumping tanks to force water upwardly therefrom through an associated one of said water delivery conduits.

33. The combination defined in claim 32 further comprising at least one thermally insulated holding tank situated above the uppermost of said primary pumping tanks, means for communicating said water delivery conduit of said uppermost of said plurality of pumping tanks with said holding tank, and means for injecting steam into said holding tank to heat said water therein to sterilizing temperatures.

34. The combination defined in claim 33 wherein said means for directing said water to said hydroelectric generating station comprises a reservoir situated above said generating station, a pipe communicating said reservoir with said generating station and valve means for selectively releasing water from said holding tank into said reservoir.

35. The combination defined in claim 33 further comprising an air pump, means for communicating said air pump with said holding tank for forcing air into the water contained therein, and a steam driven turbine drivingly coupled to said air pump.

36. The combination defined in claim 32 further comprising a plurality of annular water injection means each being disposed around the periphery of the uppermost portion of a separate one of said pumping tanks and having a plurality of flow aperture forming means for causing incoming water to flow into the associated tank at a plurality of spaced apart points around the inner wall thereof, each of said water injection means being communicated with said water delivery conduit from the next lower one of said pumping tanks.

37. The combination defined in claim 32 further comprising at least one steam condensor disposed at said means for directing water from said elevated location to said hydroelectric generating station turbine in heat exchanging relationship therewith and steam condensation valve means for selectively communicating each of said pumping tanks with one of said condensors whereby steam exhausted from said pumping tanks in the course of pumping cycles thereof is condensed by heat exchange to water enroute to said turbine.

38. The combination defined in claim 32 further comprising a steam turbine driven water pump having a high pressure water outlet and valve means communicated with said outlet for selectively spraying water into each of said pumping tanks following discharge of water therefrom to promote condensation of the steam remaining in said tanks following discharge of water therefrom.

39. The combination defined in claim 32 further comprising a float disposed in each of said pumping tanks and extending across the internal chamber thereof for preventing contact between said water and steam in said tanks.

40. The combination defined in claim 32 wherein the lowermost of said pumping tanks is situated less than 32 ft. (9.75M) above the source of said water and wherein said means for filling said lowermost tank with water comprises means for selectively filling said lowermost pumping tank with steam from said supply conduit, means for isolating said lowermost tank from said steam supply conduit, a water conduit extending from said lowermost tank to said waste water source, and means for injecting water into said lowermost tank to condense said steam thereby creating a vacuum to draw water from said waste water source.

41. The combination defined in claim 32 further comprising a plurality of secondary pumping tanks vertically spaced apart a distance substantially less than the vertical spacing of said plurality of primary pumping tanks, a second plurality of water delivery conduits each communicating the lower portion of one of said secondary pumping tanks with the next higher one of said secondary pumping tanks, means for selectively filling the lowermost of said secondary pumping tanks with said water, and, valve means for selectively communicating ones of said primary pumping tanks with ones of said secondary pumping tanks whereby steam which is to be discharged from said primary pumping tanks may be utilized to force water upwardly from ones of said secondary pumping tanks to a higher one thereof.

42. The combination defined in claim 30 wherein said pumping means comprises a water flow conduit means extending between said water source and said elevated location and having at least one rotary mechanical water pump therein, at least one steam driven turbine drivingly coupled to said water pump and having a steam intake receiving steam from said well and having a steam outlet communicated with said water flow conduit means to discharge steam therein whereby water is heated while being pumped.

43. The combination defined in claim 30 wherein said pumping means comprises a water flow conduit means extending from said water source to said elevated location, at least one housing means forming a hollow steam jacket around a portion of said water flow conduit means, a plurality of steam injection nozzle forming means disposed within said housing and communicating the interior region thereon with the interior of said conduit means, said steam injection nozzle means being oriented to inject steam into said water flow conduit means in the direction of water flow therein, and means for admitting steam from said well into said housing.

44. The combination of claim 43 further comprising a mechanical rotary water pump forming a portion of said water flow conduit means, and wherein said means for admitting steam into said housing includes a steam driven turbine having an intake receiving steam from said well and having a steam discharge outlet communicated with said housing, said turbine being drivingly coupled to said pump.

* * * * *